United States Patent [19]

Richardson

[11] Patent Number: 4,491,206

[45] Date of Patent: Jan. 1, 1985

[54] BRAKING DEVICE

[75] Inventor: Walter L. Richardson, Pointe Claire, Canada

[73] Assignee: Northern Telecom Limited, Montreal, Canada

[21] Appl. No.: 470,250

[22] Filed: Feb. 28, 1983

[51] Int. Cl.³ .............................................. B60T 13/04
[52] U.S. Cl. ........................................ 188/166; 57/19; 188/75; 192/8 R; 192/70.21; 192/79; 192/101
[58] Field of Search ...................... 188/166, 74, 75, 76, 188/77 R, 72.9; 74/96, 471 R; 242/156, 156.2, 75.43; 57/19, 3; 192/8 A, 8 R, 11, 70.21, 79, 99 R, 101

[56] References Cited

U.S. PATENT DOCUMENTS 3,292,742  12/1966  Thomas ............................... 188/166

Primary Examiner—Duane A. Reger
Assistant Examiner—Michael P. Gilday
Attorney, Agent, or Firm—R. J. Austin

[57] ABSTRACT

A braking device with two braking members for frictional engagement with a surface and a brake release linkage, a part of which is pivotable about two positions. A feature is provided to cause pivotal movement of the part in a first sense upon application of an initial brake release load upon the linkage part to reduce and then release the braking load applied by the first braking member. The application of an additional brake release load effects pivotal movement of the linkage part in a second sense to reduce and then release the braking load by the second braking member.

3 Claims, 7 Drawing Figures

BRAKING DEVICE

This invention relates to braking devices.

In many industries, when material of indefinite length is being drawn off holding members such as spools or reels, braking mechanisms are used to control tension in the material. The braking load imparted by such mechanisms is adjustable as demand for the material at a downstream position along a processing line increases or decreases. The adjustment in the braking load has the object of maintaining constant tension in the material as it is fed along the processing line. An increase in demand is reflected by an increase in the pulling load upon the material. It might be found that while the braking mechanism operates effectively to control tension at relatively slow feedspeeds, at faster feedspeeds the mechanism may be too insensitive. This lack of sensitivity may result in intermittent, total brake release, instead of a varying small braking load, so that substantially constant tension is impossible to achieve at fast feedspeeds. In contrast, intermitent total brake release causes the sudden application and release of a small but significant end load upon the material. This sudden, on and off, application of load is known to be damaging for some materials which tend to tear upon the application of sudden tensile load. Also, it results in the avoidance of constant tensile load which is essential for quality control of some products. For instance in the telecommunications cable field, insensitive oeration of a braking mechanism during the automatic winding of paper material to form a layer around a cable core may have deleterious effects upon the electrical properties. Changes in tension upon the paper as it is being wound may cause changes in the diameter of the wrapping upon the core and this will have an effect upon the desired mutual capacitance of the conductors in the cable during use. This may render cables unacceptable. Apart from this, during manufacture if the tension upon the paper material is suddenly increased by an insensitive braking mechanism, then resultant breakages in the wrapping material will affect the operating speed of the machine.

The present invention provides a braking device having two braking members which are operated in such a way that one of the braking member varies its braking effect under low-pulling loads and the other braking member varies its braking effect under higher-pulling loads. With such a braking device, the two braking members thus have different operational sensitivities and the second braking member may be more sensitive to operation than the first operating member.

Accordingly, the present invention provides a braking device comprising a rotatable member having a brake engaging surface and a braking means comprising:

(a) two braking members for frictionally contacting said surface and (b) a brake release linkage comprising a part which is pivotable about two positions and means to cause pivotal movement of the part in a first sense relative to the two spaced positions upon the application of an initial brake release load upon the linkage part to effect reduction and then release of the braking load by the first braking member upon said surface and to cause pivotal movement of said part in a second sense relative to the two spaced positions upon the application of an additional brake release load upon the linkage part to effect reduction and then release of the braking load by the second braking member upon said surface.

Ideally, there is no commencement in the release of the second braking member from the engaging surface until the first braking member has been totally released from the surface. In a practical construction the first member is acted upon by a spring to release it from the brake engaging surface and the spring action causes pivotal movement of the linkage part about the first load application position. Upon the first member being released, its movement is stopped and further movement of the linkage part takes place about the second load application location to cause the second braking member to move away from the brake engaging surface.

The first and second load application locations and their relationship to points on the linkage where the brake release load is applied to each of the braking members is advantageously such as to provide a mechanical advantage and produce an operation of the second member which is more sensitive to changing load than that for the operation of the first member.

One embodiment of the invention will now be described by way of example with reference to the accompanying drawings in which.

Figure 1:
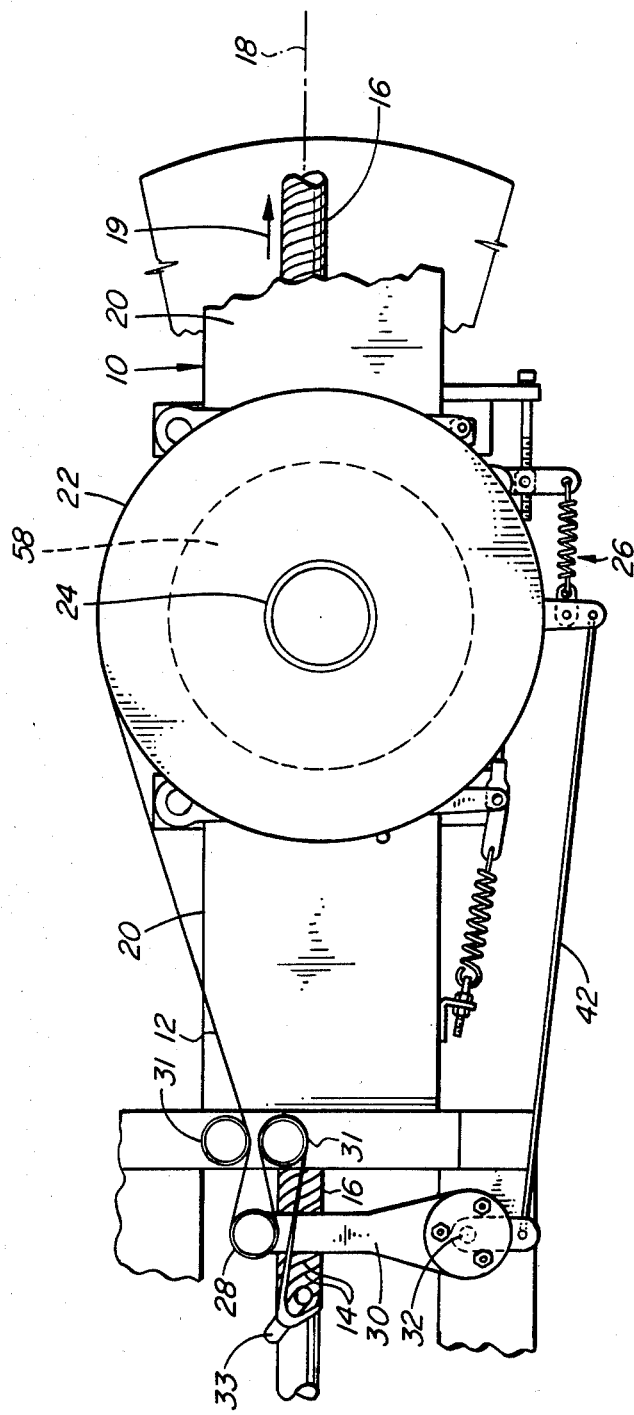
FIG. 1 is a side elevational view of a taping apparatus showing paper tape being applied to a telecommunications cable.

As shown by FIG. 1, there is provided a taping apparatus 10 for applying tape 12 as a core wrapping material 14 around a core 16 of a telecommunications cable as the cable is being passed along the feed path 18 as shown in the direction of arrow 19. The feed path 18 passes through a box structure 20 of the apparatus and a spool 22 holding the tape 12 is secured to a spindle 24 which projects from and is rotatably mounted upon one side of the box structure 20. The rotational movement of the spindle and spool is restricted by a braking mechanism indicated generally at 26, which applies a braking load controlled by the feed or draw off speed of the material 12 as will now be described.

Figure 2:
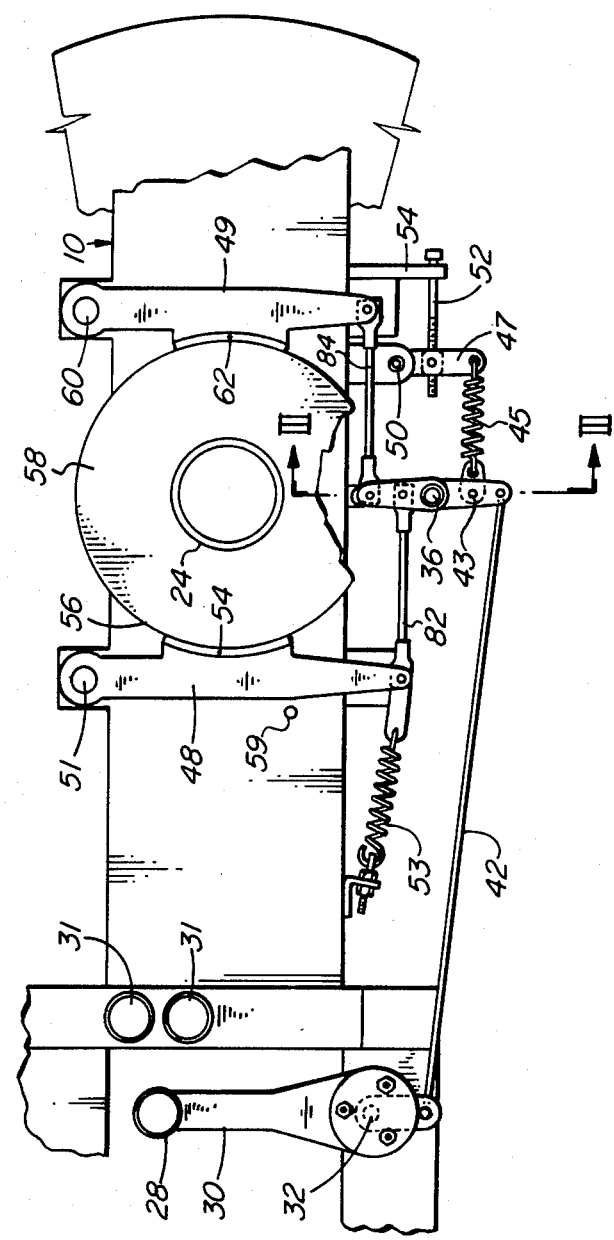
FIG. 2 is a view similar to FIG. 1 with a spool for the tape being omitted for clarity.

As shown by FIGS. 1 and 2 the braking mechanism is varied in its braking effect in a conventional manner by the use of a dancing roll 28 mounted upon the free end of an arm 30, which is pivotally mounted at 32 to the structure. The tape 12 is fed from spool 22 around the roller 28 and is held in a position around the roller by two guiding rollers 31. From the rollers 28 and 31, the tape 12 is fed around a non-rotatable guide finger 33 which is inclined and changes the plane of the material, as shown, to enable it to be wrapped around the core as the core is fed along the pass line 18. The core is stranded from an upstream position (not shown), by conventional means.

Figure 3:
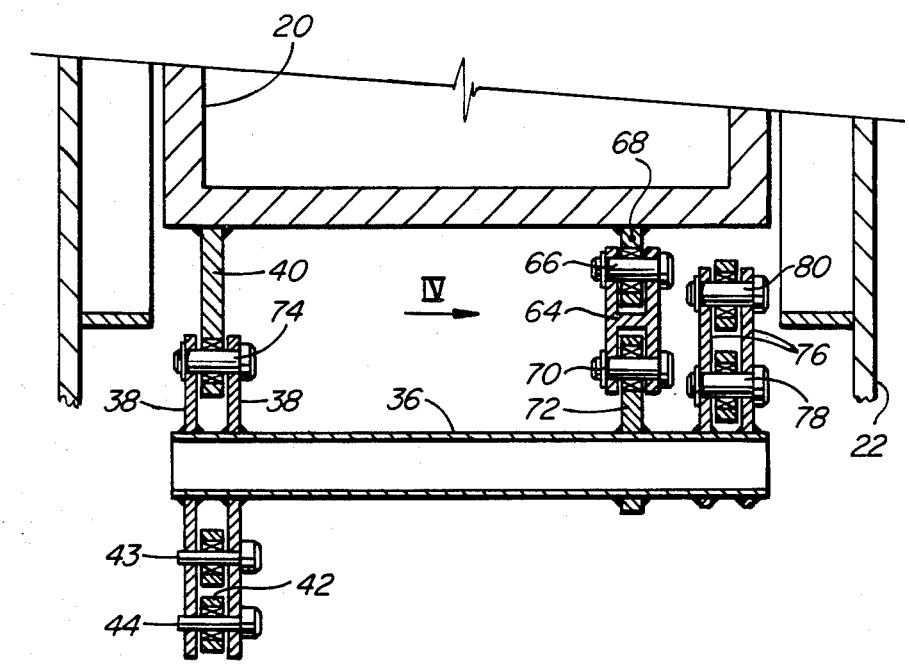
FIG. 3 is a cross-sectional view through the apparatus taken along line "III—III" in FIG. 2 and on a larger scale.
Figure 4:
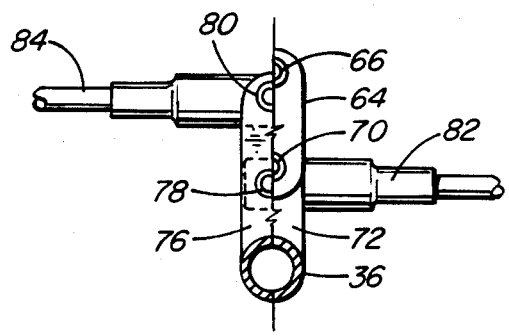
FIG. 4 is a multi cross-sectional view of the apparatus taken in the direction of arrow IV in FIG. 3.

The braking mechanism is shown in detail in FIGS. 2, 3 and 4.

The braking mechanism 26 incorporates a brake release linkage which comprises a shaft 36 which extends with its axis parallel to that of the spindle 24 at one side of the box structure 20. The shaft 36 is mounted at one end between the ends of a link which comprises two parallel spaced link plates 38. The plates 38 are pivotally mounted at their upper ends to a vertical arm 40 depending from the structure 20 about axis 74 spaced radially from the shaft 36. The pivotal connection at axis 74 is such as to allow for radial swinging movement of the shaft 36 at its other end about the arm 40. A brake rod 42 extending from the arm 30 is pivotally connected to the lower ends of the arms 38 at position 44. Movement of the dancing roll to pivot the arm 30 in a clockwise direction in FIGS. 1 and 2 will, of course, move the brake rod 42 towards the left to pivot the link plates 38 about their pivotal axis 74 in a brake release sense. A spring means comprising tension spring 45 is provided for urging the link plates 38 in a braking direction and thus against the release action of the brake rod 42. This spring 45 acts upon the link plates 38 at a position 43 intermediate the shaft 36 and the position 44.

The spring 45 is held at another end by a vertical plate 47 which is pivotally mounted at 50 to the structure 20. An adjustment screw 52 acts between a stop 54 and the plate 47 to adjust the position of the plate and thus the amount of tension applied by the spring.

As shown by FIG. 2, the braking device includes two braking members 48 and 49. The member 48 is a brake shoe pivoted at its upper end 51 to the box structure 20 and having a tension spring 53 secured to its lower end to urge it towards a "brake-off" position in which a brake liner 54 lies out of engagement with a brake engaging surface 56 of a brake drum 58 coaxially secured to and rotatable with the spindle 24. In the "brake-off" position, the shoe 48 engages with a stop pin 59 which is mounted on the structure 20. The braking member 49 is also a brake shoe pivotally mounted at its upper end 60 to the structure 20 and has a brake liner 62 engageable with the surface 56.

The brake release linkage further comprises a mounting link 64 (see particularly FIG. 3) which is pivotal about two spaced positions. At a first position 66, the link 64 is secured to a depending bracket 68 of the frame 20. At a lower position 70, the link 64 is pivotally connected to an upstanding flange 72, which is secured to the shaft 36 in a position axially spaced from the link plates 38 as shown by FIG. 3. Hence at flange 72, the shaft 36 may be pivoted about either the upper or lower positions 66 and 70. It should be noted that in the "brake-on" position, i.e., with the braking members 48 and 49 in full engagement with the engaging surface 56 to provide a braking effect upon the brake drum 58, the axes of the pivotal positions 66 and 70 are vertically in alignment with the pivotal position 74 at the top of the link plates 38. Also it should be noted that the axis at position 70 (FIG. 3) lies slightly below the axis of the position 74, while the axis of position 66 is spaced by a larger distance above the axis of position 74.

The brake release linkage also provides part of linkage which connects the shaft 36 with each of the brake shoes 46 and 48. As shown particularly by FIG. 3, an operating link in the form of a vertical pair of spaced link plates 76 is provided at the end of the shaft 36 remote from the plates 38. These plates are connected at two spaced pivotal positions 78 and 80, respectively, to brake rods 82 and 84 which are in turn pivotally connected to the lower ends of the shoes 48 and 49. It should be noted at this stage that the pivotal connections 78 and 80 in the "brake-on" position shown in FIG. 2 are also in vertical alignment with the position 74 and that the axes of the positions 78 and 80 are respectively slightly below the axes of positions 70 and 66.

Figure 5:
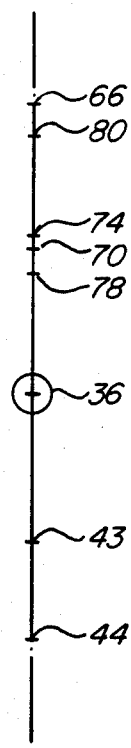
FIGS. 5, 6 and 7 are diagrammatic side elevational views, taken in the same direction as FIG. 2 and showing geometrically different positions of a braking mechanism of the apparatus during operation.
Figure 6:
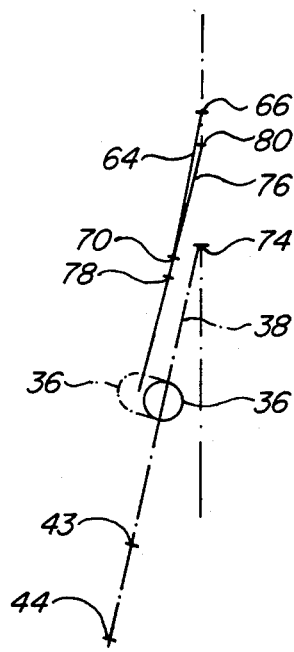

In use with the spool 22 mounted upon the apparatus as shown in FIG. 1, the wrapping material, which in this case is made from paper, is fed around the rollers 31 and 28 and is changed in direction around inclined finger 33 to be wrapped around the core 16 as previously described and shown in the drawing. Normally, with little or no tension applied to the roller 28, the two brake shoes 48 and 49 are applied fully against the brake engaging surface 56 by spring 45. This position is as shown in FIG. 2 in full outline and also by the geometry of the pivotal points in FIG. 5. However, upon the wrapping material 12 becoming tensioned, the dancing roller 28 is pulled so as to urge the arm 30 clockwise under an initial brake release load and thus pull the link plates 38 in a clockwise direction as viewed in FIG. 2. This causes the shaft 36 to pivot around the position 74 from the vertical in-line position, as shown in FIG. 5, towards that shown in full outline in FIG. 6. This turning of the shaft 36 and the inclination of the link plates 38 to the vertical shown by dotted outline 38 in FIG. 6 is accompanied by an equal angular movement of the torsionally rigid shaft 36 at its other end. The effect of this is to allow the spring 53 to pull the shoe 48 in a clockwise direction so that it tends to move away from the brake engaging surface 56. At the same time, the pull rod 82 acts upon the pivotal position 78 in a horizontal direction to urge that end of the shaft 36 towards the shoe 48. In consequence, the brake rod 82 also pulls against the brake rod 84 to retain the brake shoe 49 firmly in engagement with the surface 56 and the pivotal position 80 is thus maintained substantially in vertical alignment with the pivotal position 74. The effect of this is that the linkage at the right hand end of the shaft 36 (as shown in FIG. 3) is caused to pivot about the upper pivotal position 66 of the link 64 and also about the pivotal position 80. The pivoting action is effected as the plates 76 tilt about position 80 to an angle of orientation substantially equal to that of plates 38 which causes a certain angular movement of flange 72. This movement of flange 72 effects a certain angular movement of the link arm 64 around position 66. Movement about the two non-aligned pivotal positions 66 and 80 is possible because position 80 is not rigidly fixed relative to the frame 20 an moves slightly in a substantially vertical manner to accommodate for movement around fixed position 66. The shaft 36 thus becomes inclined towards the brake shoe 48. This is shown by the dotted outline position for the shaft 36 in FIG. 6. The movement of the brake shoe 48 away from the surface 56 continues under the application of a relatively small brake release load, which is below a certain limit, until the shoe engages the stop 59 as shown in dotted outline in FIG. 2. At this position, the relative locations of the pivotal positions 66 to 80 are shown in FIG. 6. Also in this Figure the relative dispositions of the link 64 and the link arms 76 are shown.

Figure 7:
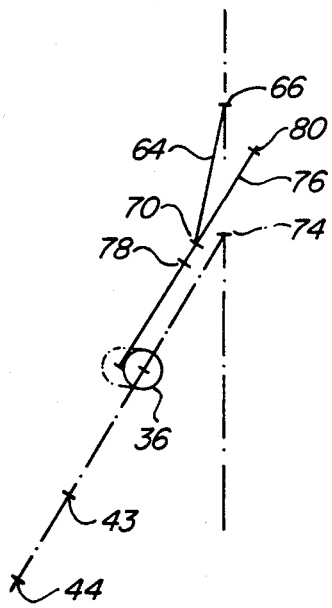

After the brake shoe 48 engages the stop 59, if the speed of drawing off of the material 12 increases thus causing the dancing roller to move further to the right, then an additional brake release load is applied. Should this occur, then upon further movement of the link plates 38 in a clockwise direction in FIG. 2, a different action at the right hand end of shaft 36 (FIG. 3) then takes place. This increase in load cannot act by moving the brake shoe 48 any further because the stop 59 prevents pivotal position 78 from moving towards the left as in Fig. 6. Thus any further clockwise movement takes place around position 70 as a pivot with spring 53 pulling upon shoe 48 and brake rod 82. This pivotal movement is allowed for by slight anti-clockwise movement of the link 64 about the pivotal position 66 until the brake release linkage is in the position shown in FIG. 7. During this movement, the pivotal position 78 moves vertically slightly to allow for a pivotal movement of the pivot position 70 around the pivotal position 66. The brake links 76 are turned clockwise so that pivotal position 80 moves towards the brake shoe 48. This also is shown in FIG. 7. This movement of pivotal position 80 acts upon the brake rod 84 to move the brake shoe 48 in a counterclockwise direction and away from the surface 56.

As can be seen from the above description, a single mechanism enables the release of two brake shoes in succession from a brake engaging surface. It will be appreciated that the spring 53 in conjunction with stop means 59 act as a means to cause pivotal movement of the operating link plates 76 in both the first sense during application of the initial load and in the second sense upon application of the additional load. It should also be noted that the mechanical advantage offered by the mechanism is such that the brake shoe 49 is released more slowly under a particular load increase than is the case for brake shoe 48. On this point as will be noted from FIG. 3 particularly, and also from FIGS. 6 and 7, the relative locations of the various pivotal positions are such as to enable this to take place. As can be seen from FIG. 6, the initial movement of the link arms 38 in the clockwise direction is accompanied by substantial movement of the pivotal position 78 towards the left as viewed in that figure. This is because of the ratio of the distances of the axis of the shaft 36 and the axis of the pivotal position 78 from the pivotal position 66, which is the primary position about which movement takes place during initial loading. Upon continuation of the loading when movement of the brake shoe 49 takes place, it is noticeable from FIG. 7 that the movement of brake shoe 49 is more delicate operation than the shoe 48 because of the location of the pivotal position 70 in relation to the centre of shaft 36 and pivotal position 80. Therefore, there is a greater control of the change in braking load on the surface 56 by the shoe 49 upon a certain degree of movement of the arm 30. Thus this control enables extremely small and controllably changeable braking loads to be applied upon the rotatable member 58 for relatively high feedspeeds of the wrapping material 12. Sudden application and release of braking load leading to its sudden increase or decrease is thus avoided, thereby reducing any tendency for the paper wrapping material 12 to break. Also there is a greater degree of control upon the finished tension of the material when wrapped around the cable core with the result that there is greater control in the wrapped diameter of the material around the core. This, of course, leads to a greater control in the mutual capacitance between the conductors of a cable.

What is claimed is:

1. A braking device comprising a rotatable member having a brake engaging surface and a braking means comprising:
    (a) two braking members for movement into frictional contact with said surface and for release from said surface;
    (b) a stop means for limiting the degree of movement of a first of the braking members away from said surface after release of said first member; and
    (c) a brake release linkage comprising an operating link and two brake rods operably connected one to each braking member and pivotally connected to the link, one at each of two spaced positions on the link, a first spring means normally holding the braking members in frictional contact with the brake engaging surface and a means to cause pivotal movement of the link in a first sense and then in a second sense relative to the two spaced positions, said pivotal causation means comprising a second spring means acting against the first spring means upon application of an initial brake release load upon the operating link to cause link movement in said first sense and effect reduction and then release of the braking load by the first braking member upon said surface until the first braking member engages the stop means, the second spring means operable to hold the first braking member against the stop means during application of an additional brake release load to effect pivotal movement of said link in the second sense and effect reduction and then release of the braking load by the second braking member upon said surface.

2. A braking device according to claim 1 wherein the brake release linkage comprises a torsionally rigid shaft pivotally mounted at one axial mounting position to pivot around a fixed axis radially spaced from the shaft, said link being secured to and extending radially from the shaft at another axial position, the shaft having freedom to swing radially about said one axial position and application of the initial and additional brake release loads operable to effect pivotal movement of the shaft against action of the first spring means and to enable the second spring means to cause movement of the link in its first and second senses accompanied by swinging movement of the shaft under influence of the second spring means.

3. A braking device according to claim 2 wherein the shaft is pivotally mounted at a second axial mounting position to a mounting link which is pivotally connected at one end to the shaft and has a pivotal connection in a fixed position at the other end, pivotal and swinging movement of the shaft allowed for by pivotal movement of the mounting link around the fixed position and also by pivotal movement of the shaft upon the mounting link, the two pivotal positions of the operating link having freedom to move relative to said fixed position to allow for the swinging movement.

* * * * *